United States Patent Office 3,484,438
Patented Dec. 16, 1969

3,484,438
PHENTHIAZINE DERIVATIVES
Pierre Bosc, Paris, France, assignor to Rhone-Poulenc S.A., Paris, France, a French body corporate
No Drawing. Filed Sept. 22, 1967, Ser. No. 669,672
Claims priority, application France, Sept. 29, 1966, 78,185
Int. Cl. C07d 93/14; A61k 27/00
U.S. Cl. 260—243      2 Claims

ABSTRACT OF THE DISCLOSURE

Phenthiazine derivatives of the formula:

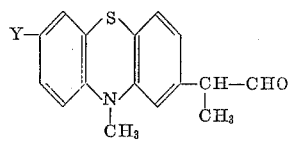

wherein Y is hydrogen, halogen, methyl, ethyl or methoxy, are useful starting materials for corresponding compounds in which the aldo group is replaced by carboxyl, which 2-(10-methyl-3-phenthiazinyl)-propionic acids are active as anti-inflammatory and anti-rheumatic agents. The aldo compounds of the said formula also have such activity.

---

This invention relates to new phenthiazine derivatives and to a process for their preparation.

The new phenthiazine derivatives of the invention are those of the general formula:

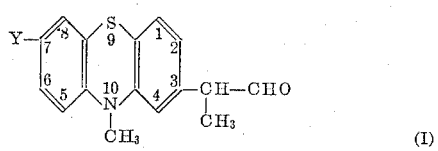

wherein Y represents a hydrogen or halogen atom or a methyl, ethyl or methoxy group.

These phenthiazine derivatives can be prepared by carrying out Darzens' reaction on 3-acetylphenthiazines of the general formula:

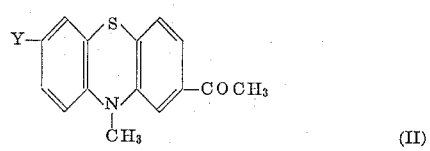

wherein Y is as hereinbefore defined. Thus, they are prepared, according to a feature of the present invention, by reacting a 3-acetylphenthiazine of Formula II with a reactive ester of the general formula X—CH$_2$—COOR$_1$ (wherein X represents the acid residue of a reactive ester, preferably a chlorine atom, and R$_1$ represents an alkyl group having 1 to 4 carbon atoms) in the presence of an alkaline condensing agent, saponifying the resultant epoxy-ester of the general formula:

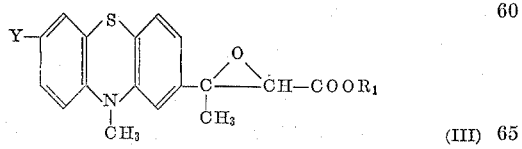

(wherein Y and R$_1$ are as hereinbefore defined), and hydrolysing and decarboxylating the salt thus obtained by heating, optionally in the presence of an acid, for example hydrochloric acid.

The alkaline condensing agent preferably employed during the reaction of the acetylphenthiazine with the aforesaid reactive ester is sodium ethoxide or sodamide. The reaction can be carried out in the absence or presence of an inert organic solvent.

Saponification of the intermediate epoxy-ester of Formula III is effected with an alkaline reagent, for example sodium hydroxide, in aqueous or alcoholic medium.

The 3-acetylphenthiazines of Formula II and their preparation have been described in the specification of application Ser. No. 505,428, applied for by D. Farge, C. Jeanmart and M. N. Messer on Oct. 25, 1965.

The new phenthiazine derivatives of Formula I may be employed as starting materials for the synthesis of therapeutically useful phenthiazine compounds, more particularly for the preparation of the known corresponding acids of the general formula:

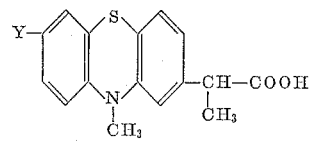

(wherein Y is as hereinbefore defined) which are particularly active as anti-inflammatory and anti-rheumatic agents. The phenthiazine derivatives of general Formula I also have such activity.

The preparation of acids of Formula IV from aldehydes of Formula I is effected by application of known methods, for example by the following operations: conversion of the aldehyde into the corresponding oxime, dehydration of the oxime into the nitrile and then saponification of the nitrile with an alkali metal hydroxide.

The following example illustrates the preparation of phenthiazine derivatives of Formula I.

EXAMPLE

Sodium ethoxide (41 g.) is added to a suspension of 3-acetyl-10-methylphenthiazine (100 g.) in ethyl chloracetate (73.5 g.) cooled at 5° C. The reaction mixture is then stirred for 6 hours at ambient temperature, and afterwards, over a period of 20 minutes, there is added the mixture obtained from sodium hydroxide pellets (41 g.), water (20 cc.) and methanol (250 cc.). The reaction mixture is stirred for a further 90 minutes, then poured into water (1 litre) and the solution obtained, after washing with benzene to eliminate impurities, heated under reflux for 2 hours. The reaction mixture is extracted with benzene (3×400 cc.), and the benzenic extracts are dried over anhydrous sodium sulphate and then evaporated under reduced pressure. There are obtained 107 g. of a crude product which, after chromatography on activated silica and crystallisation, gives 2-(10-methyl-3-phenthiazinyl)propionaldehyde, M.P. 80° C.

I claim:
1. A phenthiazine derivative of the formula:

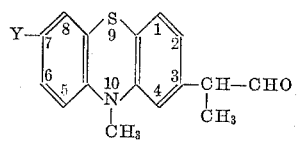

wherein Y represents a hydrogen atom or a methyl, ethyl or methoxy group.

2. 2-(10-methyl-3-phenthiazinyl)propionaldehyde.

No references cited.

HENRY R. JILES, Primary Examiner

HARRY I. MOATZ, Assistant Examiner

U.S. Cl. X.R.
260—999